US011948374B2

(12) United States Patent
Ramaswamy Srinivasa et al.

(10) Patent No.: US 11,948,374 B2
(45) Date of Patent: Apr. 2, 2024

(54) SYSTEMS AND METHODS FOR DETECTING TEXT OF INTEREST

(71) Applicant: Walmart Apollo, LLC, Bentonville, AR (US)

(72) Inventors: Ramanujam Ramaswamy Srinivasa, Bengaluru (IN); Manish Kumar, Bangalore (IN); Pranav Aggarwal, Navi Mumbai (IN)

(73) Assignee: WALMART APOLLO, LLC, Bentonville, AR (US)

( * ) Notice: Subject to any disclaimer, the term of this patent is extended or adjusted under 35 U.S.C. 154(b) by 343 days.

(21) Appl. No.: 17/380,506

(22) Filed: Jul. 20, 2021

(65) Prior Publication Data
US 2023/0021506 A1  Jan. 26, 2023

(51) Int. Cl.
*G06V 20/62* (2022.01)
*G06N 20/00* (2019.01)
(Continued)

(52) U.S. Cl.
CPC ............ *G06V 20/63* (2022.01); *G06N 20/00* (2019.01); *G06V 30/1444* (2022.01); *G06V 30/1463* (2022.01); *G06V 20/625* (2022.01)

(58) Field of Classification Search
CPC ............ G06V 20/63; G06V 30/1444; G06V 30/1463; G06V 20/625; G06V 10/762;
(Continued)

(56) References Cited

U.S. PATENT DOCUMENTS 8,184,852 B2    5/2012 Hofman
9,547,800 B2    1/2017 Besiris
(Continued)

FOREIGN PATENT DOCUMENTS

WO    2009052578    4/2009

OTHER PUBLICATIONS

U.S. Appl. No. 17/380,538, filed Jul. 20, 2021, Ramanujam Ramaswamy Srinivasa.
(Continued)

*Primary Examiner* — Bobbak Safaipour
(74) *Attorney, Agent, or Firm* — Fitch, Even, Tabin & Flannery LLP

(57) ABSTRACT

In some embodiments, apparatuses and methods are provided herein useful to train a machine learning algorithm to detect text of interest. In some embodiments, there is provided a system to detect vertically oriented text of interest including a first data set comprising a plurality of captured digital images each depicting an object of interest and a second data set comprising a plurality of augmented digital images each depicting a captured digital image augmented with a synthetic text image; a first control circuit configured to cause the machine learning algorithm to output a machine learning model trained to automatically detect occurrences of vertically oriented text of interest based on the first data set and the second data set; at least one camera; and a second control circuit configured to execute the machine learning model to automatically detect vertically oriented text of interest on the object of interest.

24 Claims, 13 Drawing Sheets

(51) Int. Cl.
*G06V 30/14* (2022.01)
*G06V 30/146* (2022.01)

(58) Field of Classification Search
CPC .... G06V 2201/08; G06V 10/82; G06V 20/62; G06N 20/00
See application file for complete search history.

(56) References Cited

U.S. PATENT DOCUMENTS

| | | | |
|---|---|---|---|
| 9,773,186 | B2 | 9/2017 | Nepomniachtchi |
| 10,467,508 | B2 | 11/2019 | Wang |
| 11,670,098 | B2 * | 6/2023 | Mains, Jr. ............. G06F 18/217 348/222.1 |
| 2012/0051643 | A1 | 3/2012 | Ha |
| 2014/0363052 | A1 | 12/2014 | Kozitsky |
| 2021/0303899 | A1 * | 9/2021 | Mains, Jr. ............. G06V 20/63 |
| 2023/0025548 | A1 * | 1/2023 | Ramaswamy Srinivasa ............... G06V 20/63 |
| 2023/0325717 | A1 * | 10/2023 | Ulasen ................... G06N 20/00 706/12 |
| 2023/0350184 | A1 * | 11/2023 | Gallagher ............ G02B 21/362 |

OTHER PUBLICATIONS

Mallick, Satya; "How to select a bounding box (ROI) in OpenCV (C++/Python) ?"; <https://www.learnopencv.com/how-to-select-a-bounding-box-roi-in-opencv-cpp-python/>; Mar. 13, 2017; pp. 1-12.

Purohit, Karan; "Tutorial: Building a custom OCR using YOLO and Tesseract"; <https://medium.com/saarthi-ai/how-to-build-your-own-ocr-a5bb91b622ba>; May 9, 2019; pp. 1-10.

Reddy, Susmith; "Segmentation in OCR!! A basic explanation of different levels of Segmentation used by the OCR system."; <https://towardsdatascience.com/segmentation-in-ocr-10de176cf373>; Mar. 25, 2019; pp. 1-12.

Veena M.N, Shruthi S.J, et al.; "Detection of Oriented and Skewed Number Plate in Vehicle Using Hybrid Approach"; The International Journal of Multimedia & Its Applications (IJMA); Oct. 2015; vol. 7, No. 4/5; http://dx.doi.org/10.5121/ijma.2015.7502 ; pp. 21-30.

* cited by examiner

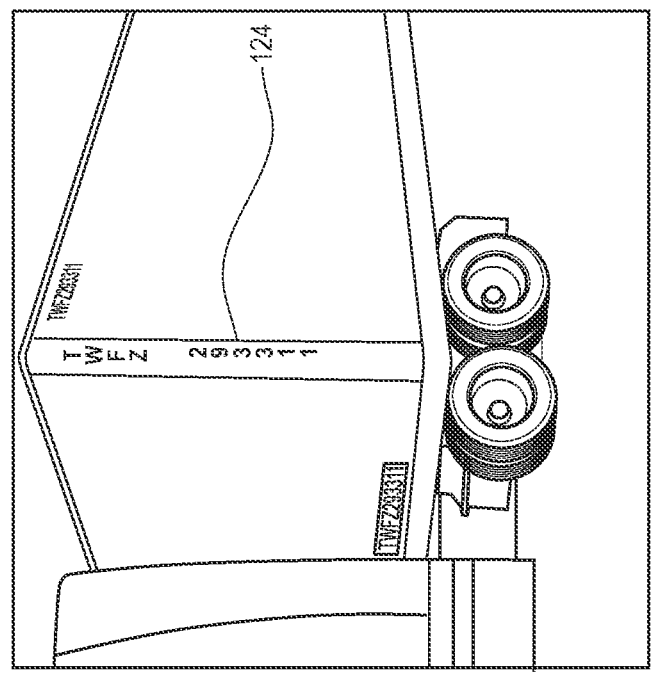
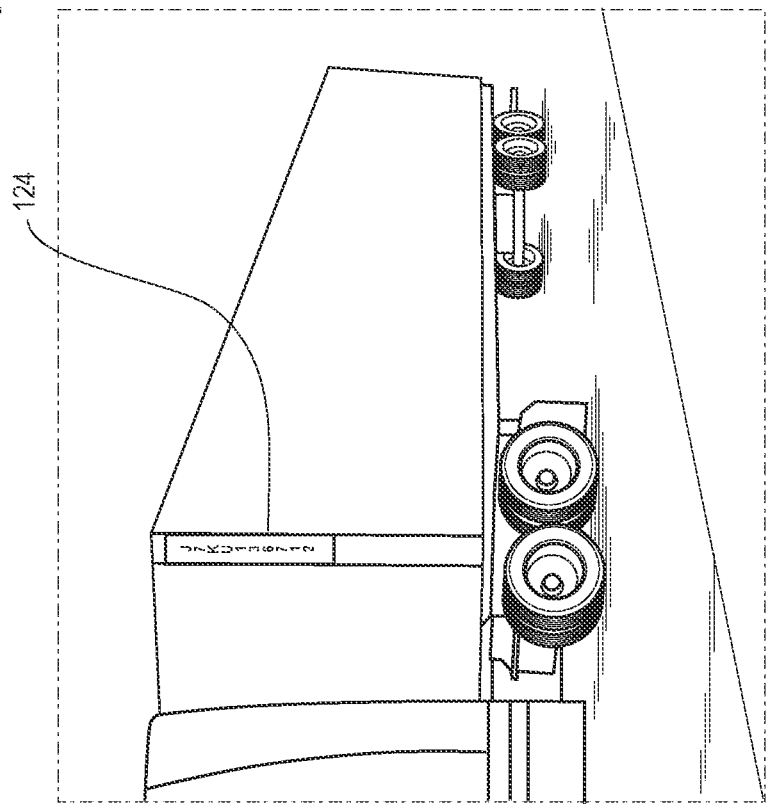
FIG. 4

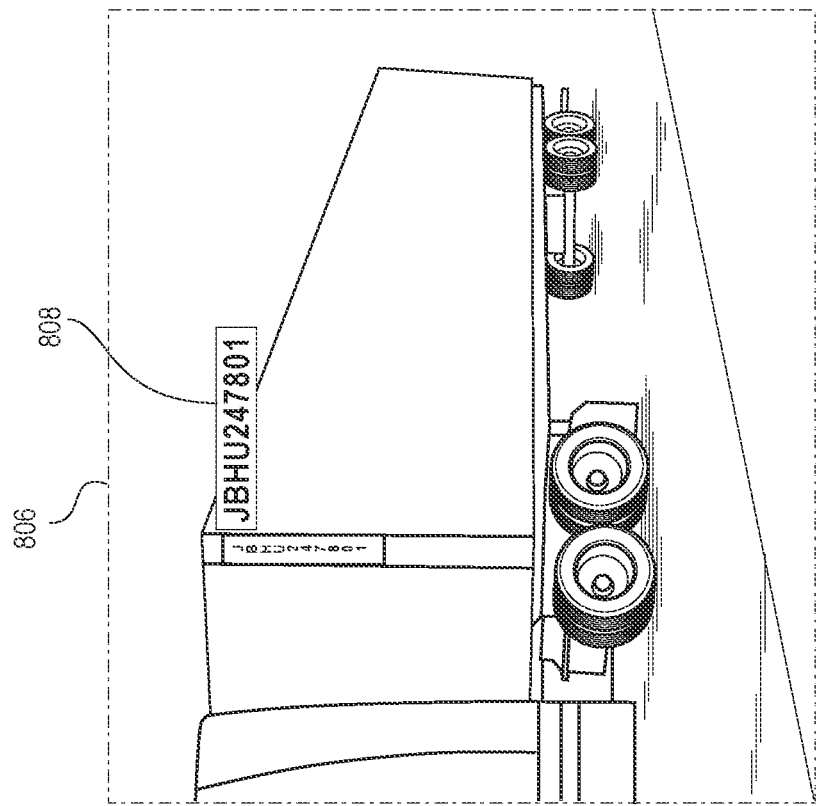
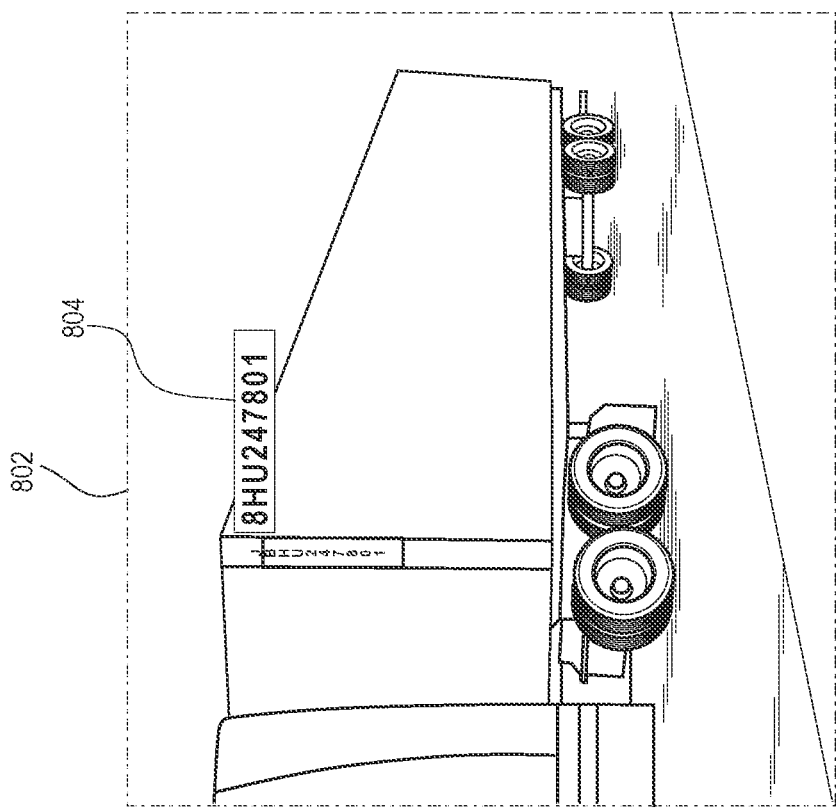
FIG. 8

SYSTEMS AND METHODS FOR DETECTING TEXT OF INTEREST

TECHNICAL FIELD

This invention relates generally to detecting text of interest, and more specifically to optically recognizing text of interest.

BACKGROUND

Generally, a vehicle has an associated identification number for ease of identifying the vehicle. The vehicle identification number generally is attached, a fixed on, painted on, and/or hung on the vehicle. It is difficult to manually identify vehicle identification numbers at least due to the extremely large volume of numbers, standards and location of numbers on vehicles. However, automatically identifying these vehicle identification numbers can be far more efficient for variety of uses.

BRIEF DESCRIPTION OF THE DRAWINGS

Disclosed herein are embodiments of systems, apparatuses and methods pertaining to the automated detection of text of interest on objects of interest, such as on vehicles. This description includes drawings, wherein:

FIG. 4 illustrates non-limiting examples of digital images depicting objects of interest having vertically oriented text of interest in accordance with some embodiments;

FIG. 8 illustrates a non-limiting example of an exemplary pattern agnostic optical character recognition (OCR) system differentiating between characters from one digital image to another in accordance with some embodiments;

Figure 1:
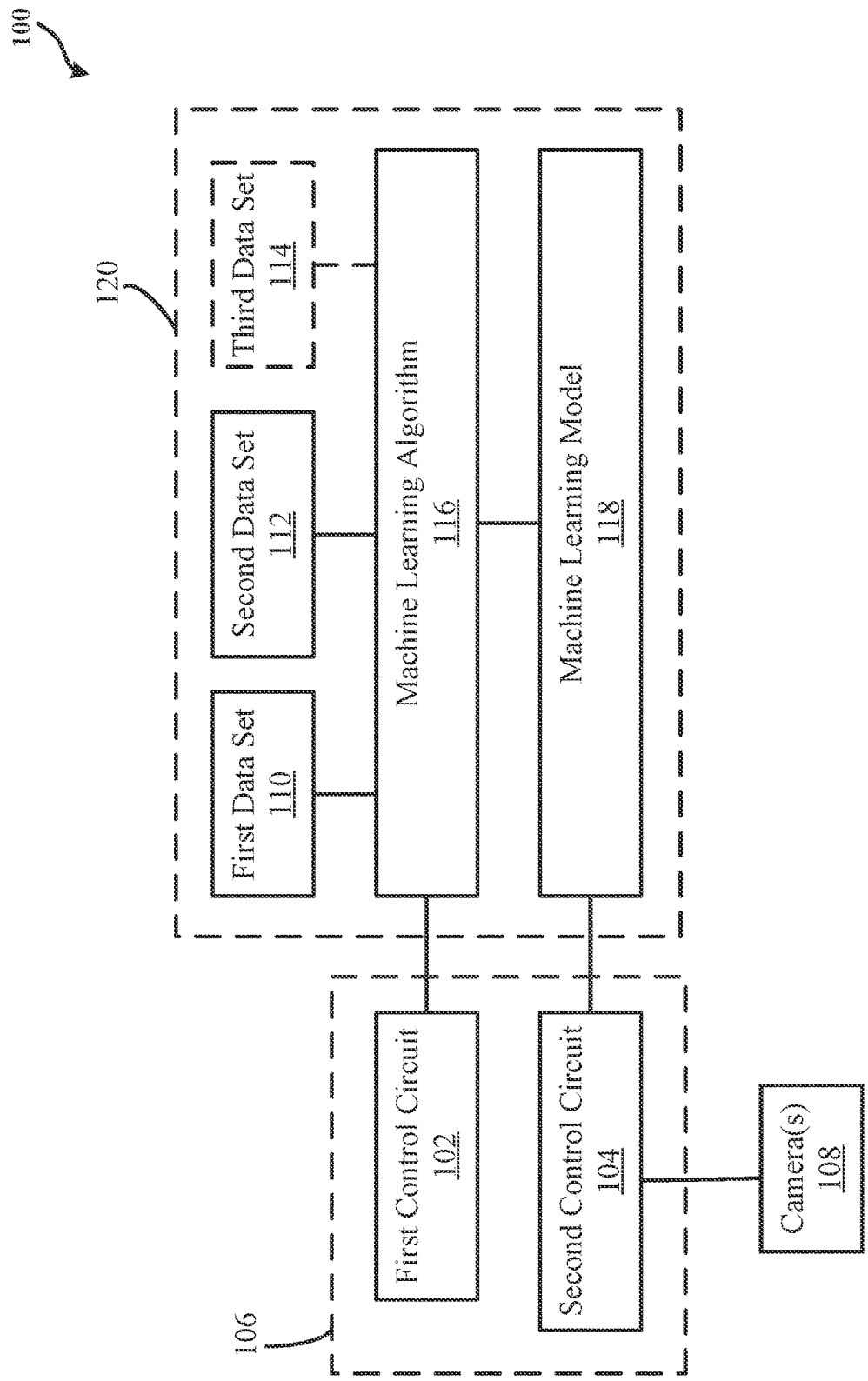
FIG. 1 illustrates a simplified block diagram of an exemplary system for detecting text of interest on an object of interest in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for identifying text of interest. In some embodiments, a system for training a machine learning algorithm to detect text of interest includes a first data set including a plurality of captured digital images each depicting an object of interest. In some embodiments, the system includes a second data set including a plurality of augmented digital images each depicting a captured digital image augmented with a synthetic text image including randomly generated text on a randomly selected background image. In some embodiments, the system includes a first control circuit. The first control circuit may execute a machine learning algorithm stored in a memory. In some embodiments, the first control circuit causes the machine learning algorithm to be executed with the first data set as a first input. In some embodiments, the first control circuit causes the machine learning algorithm to be executed with the second data set as a second input. In some embodiments, the first control circuit causes the machine learning algorithm to output a machine learning model trained to automatically detect occurrences of vertically oriented text of interest depicted in captured images based on the first data set and the second data set. In some embodiments, the system includes at least one camera configured to capture one or more digital images of a scene. In some embodiments, the system includes a second control circuit coupled to the at least one camera and configured to execute the machine learning model to automatically detect vertically oriented text of interest on the object of interest depicted in the captured one or more digital images of the scene.

In some embodiments, a method for training a machine learning algorithm to detect text of interest includes executing, by a first control circuit coupled to a memory, a machine learning algorithm stored in the memory. In some embodiments, the method includes causing, by the first control circuit, the machine learning algorithm to be executed with a first data set as a first input. By one approach, the first data set includes a plurality of captured digital images each depicting an object of interest. In some embodiments, the method includes causing, by the first control circuit, the machine learning algorithm to be executed with a second data set as a second input. By one approach, the second data set includes a plurality of augmented digital images each depicting a captured digital image augmented with a synthetic text image including randomly generated text on a randomly selected background image. In some embodiments, the method includes causing, by the first control circuit, the machine learning algorithm to output a machine learning model trained to automatically detect occurrences of vertically oriented text of interest depicted in captured digital images based on the first data set and the second data set. In some embodiments, the method includes executing, by a second control circuit coupled to at least one camera configured to capture one or more digital images of a scene, the machine learning model to automatically detect the vertically oriented text of interest on the object of interest in the captured one or more digital images of the scene.

In some embodiments, a pattern agnostic optical character recognition (OCR) system for determining text on an object includes at least one camera configured to capture one or more digital images of an object. In some embodiments, the system includes a control circuit that executes a machine learning model trained to identify text of interest on the object in each digital image of the captured one or more digital images, wherein the text of interest comprises one or more characters to be identified, and wherein each character in the text of interest corresponds to a node point. The machine learning model may further group into a cluster each node point that is located substantially in the same location in the text of interest identified in each of the captured one or more digital images. In some embodiments, the machine learning model is trained to determine a score value of each particular character in the cluster based on a weighted sum of a number of occurrences of the particular character in the cluster relative to a total sum of occurrences of all characters in the cluster and an average confidence value associated with the particular character. In some embodiments, the machine learning model is trained to identify the particular character that has a determined score value corresponding to at least a threshold score value relative to all characters in the cluster. In some embodiments, the machine learning model is trained to assign the particular character having the determined score value corresponding to at least the threshold score value as a recognized character in the cluster. In some embodiments, the machine learning model is trained to transmit to a display monitor overlay data comprising each recognized character associated with each cluster in the text of interest to cause the display monitor to display the transmitted overlay data with the captured one or more digital images.

In some embodiments, a method for pattern agnostic optical character recognition (OCR) for determining text on an object includes capturing, by at least one camera, one or more digital images of an object. In some embodiments, the method includes identifying, by a control circuit, text of interest on the object in each digital image of the captured one or more digital images. By one approach, the text of interest may include one or more characters to be identified. By another approach, each character in the text of interest may correspond to a node point. In some embodiments, the method includes grouping, by the control circuit, into a cluster each node point that is located substantially in the same location in the text of interest identified in each of the captured one or more digital images. In some embodiments, the method includes determining, by the control circuit, a score value of each particular character in the cluster based on a weighted sum of a number of occurrences of the particular character in the cluster relative to a total sum of occurrences of all characters in the cluster and an average confidence value associated with the particular character. In some embodiments, the method includes identifying, by the control circuit, the particular character that has a determined score value corresponding to at least a threshold score value relative to all characters in the cluster. In some embodiments, the method includes assigning, by the control circuit, the particular character having the determined score value corresponding to at least the threshold score value as a recognized character in the cluster. In some embodiments, the method includes transmitting, by the control circuit, to a display monitor overlay data comprising each recognized character associated with each cluster in the text of interest to cause the display monitor to display the transmitted overlay data with the captured one or more digital images.

Figure 2:
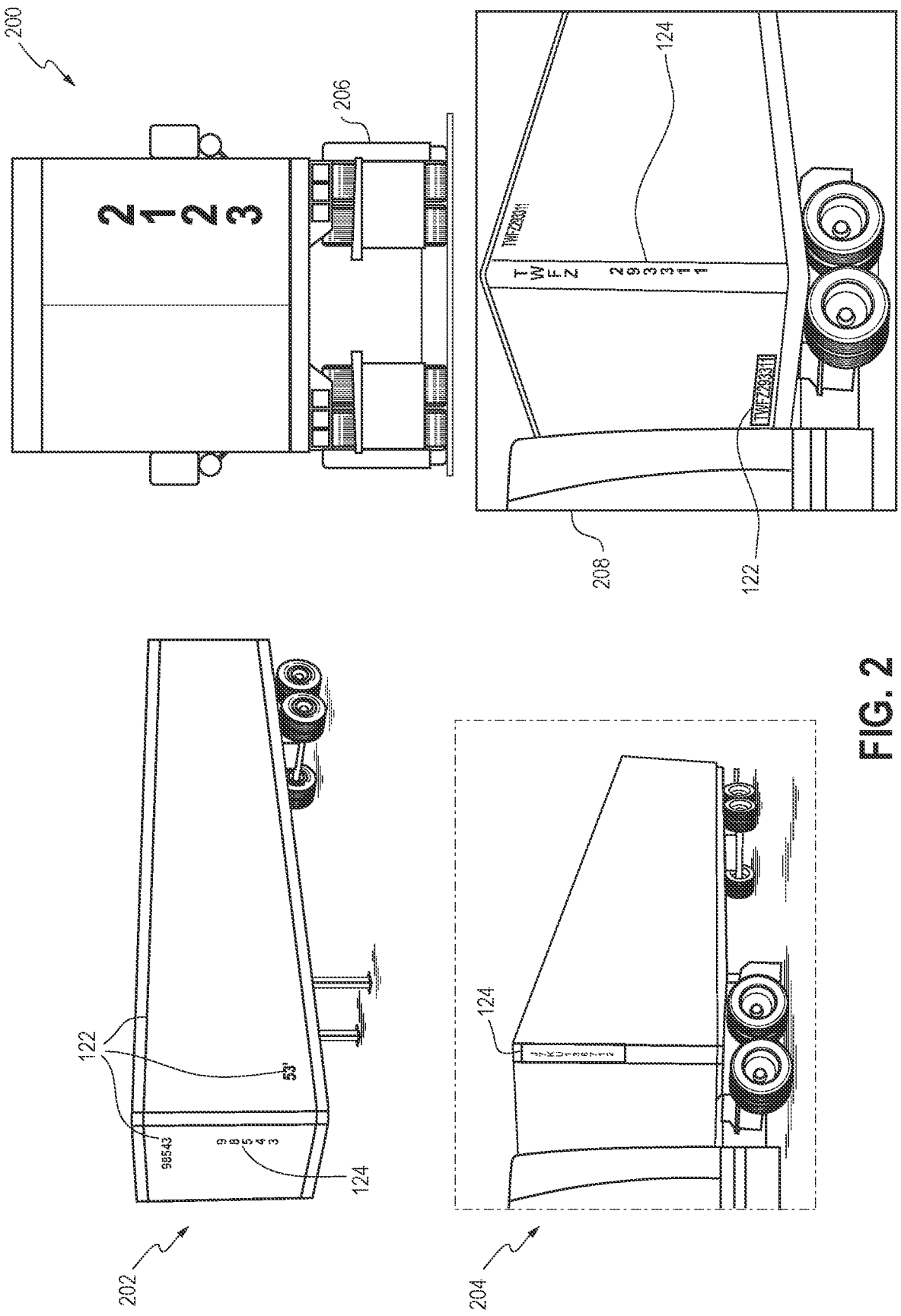
FIG. 2 illustrates non-limiting examples of digital images depicting objects of interest each having text of interest in accordance with some embodiments.
Figure 5:
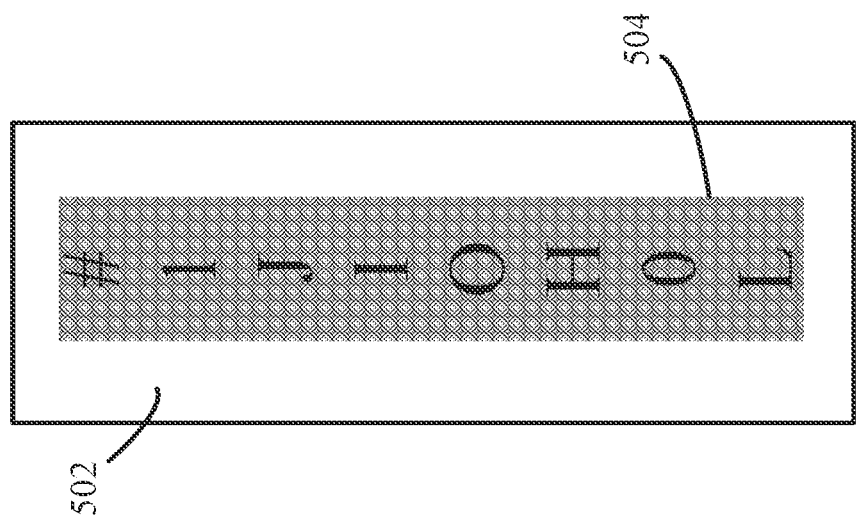
FIG. 5 illustrates a non-limiting example of text of interest padded with white images and/or pixels.
Figure 6:
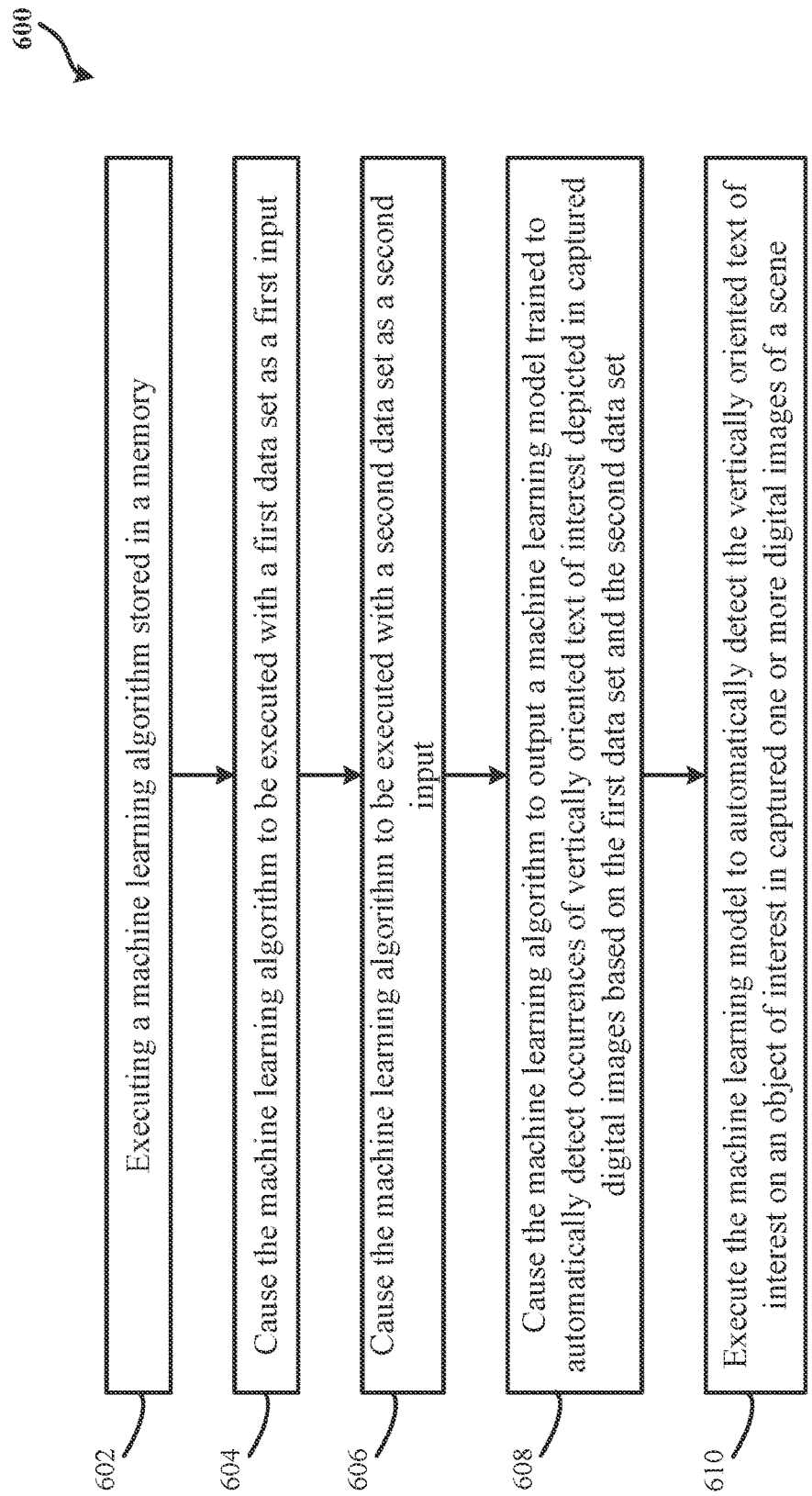
FIG. 6 shows a flow diagram of an exemplary method of detecting a vertically oriented text of interest on an object of interest in accordance with some embodiments.

To illustrate, FIGS. 1 through 13 are described below. FIG. 1 is described with FIGS. 2, 4, and 6. FIG. 1 illustrates a simplified block diagram of an exemplary system 100 for detecting text of interest 126 on an object of interest 200 in accordance with some embodiments. FIG. 2 illustrates non-limiting examples of digital images depicting objects of interest having text of interest in accordance with some embodiments. FIG. 4 illustrates non-limiting illustrative examples of digital images depicting objects of interest having vertically oriented text of interest in accordance with some embodiments. FIG. 6 shows a flow diagram of an exemplary method 600 of detecting vertically oriented text of interest on the object of interest 200 in accordance with some embodiments. In some embodiments, the system 100 trains a machine learning algorithm 116 to detect at least one of vertically oriented 124 text of interest 126 and horizontally oriented 122 text of interest 126. In some embodiments, the vertically oriented 124 text of interest 126 and/or the horizontally oriented 122 text of interest 126 includes a corresponding identification (e.g., serial number, license plate number, and/or any other type of combination of characters that identifies one vehicle from another vehicle) associated with an object of interest. In some embodiments, the vertically oriented 124 text of interest 126 and/or the horizontally oriented 122 text of interest 126 includes text having a combination of one or more characters in an alphabet, numerical characters, and symbols. The system 100 includes a first control circuit 102. By one approach, the first control circuit 102 includes a microprocessor, a server, a microcomputer, a virtual machine operable on one or more processors, a cloud computer and/or server, and/or the like. In some embodiments, the system 100 includes a first data set 110 including a plurality of captured digital images each depicting an object of interest 200. In some embodiments, the object of interest 200 includes a cargo trailer for use in distribution of goods, a truck, and/or a vehicle. Illustrative non-limiting examples of digital images depicting objects of interest 200 having text of interest 126 are shown in FIG. 2. In some embodiments, a first object of interest 202 is a cargo trailer having the vertically oriented 124 text of interest 126 and the horizontally oriented 122 text of interest 126. In some embodiments, a second object of interest 204 is a cargo trailer coupled to a truck. In such an embodiment, the second object of interest 204 includes vertically oriented 124 text of interest 126 located on a corner of its cargo trailer. In some embodiments, a third object of interest 206 is a cargo trailer having vertically oriented 124 text of interest 126 on a rear of its cargo trailer. In some embodiments, a fourth object of interest 208 is a cargo trailer having vertically oriented 124 text of interest 126 and horizontally oriented 122 text of interest 126 on a corner and rear of the cargo trailer. A person of ordinary skill in the art understands that an object of interest 200 may have one or more vertically oriented 124 and/or horizontally oriented 122 text of interest 126 on one or more sides (e.g., front, rear, left side, right side, top, edge, and/or one or more side corners) of an object of interest 200.

Figure 3:
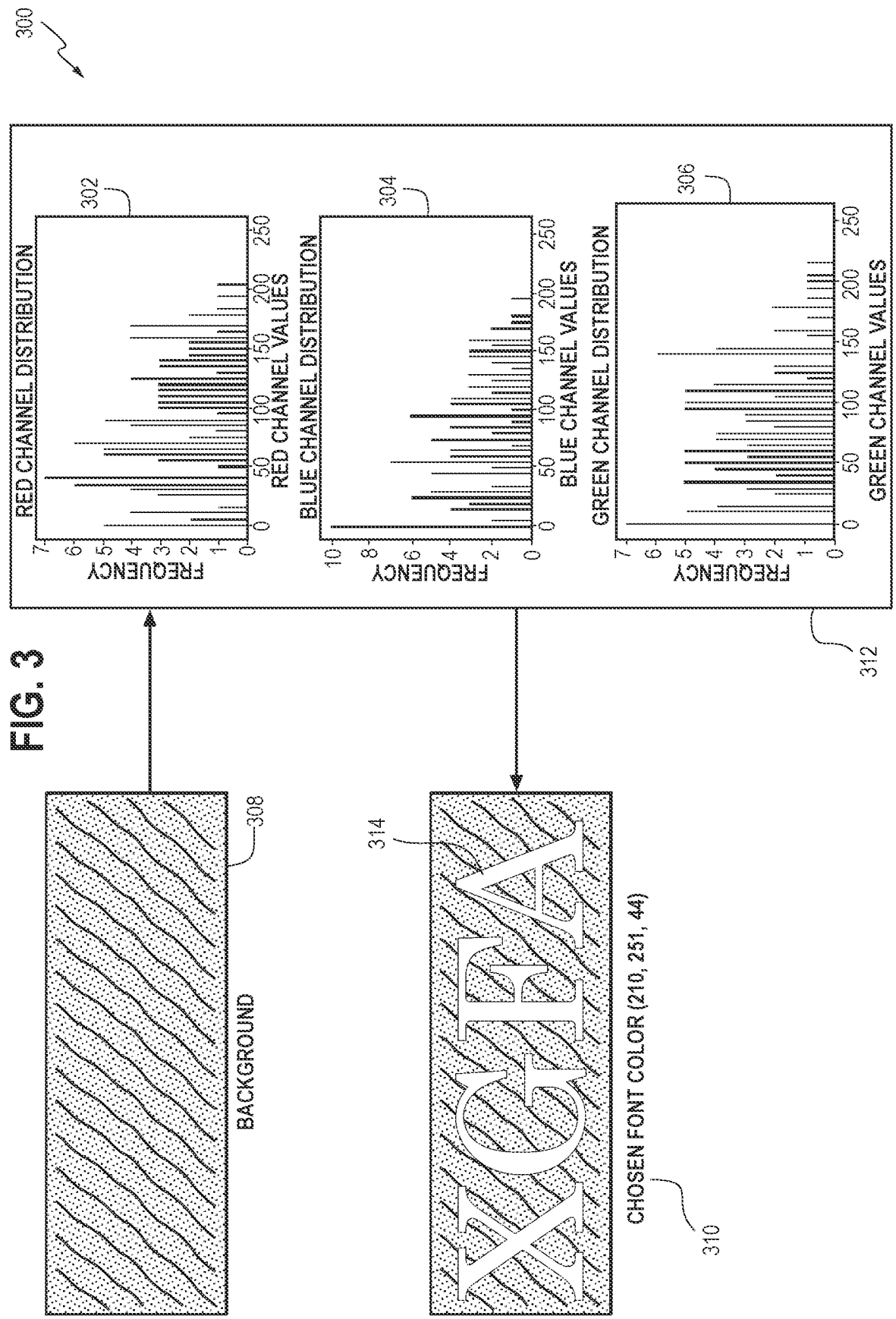
FIG. 3 is an exemplary method for creating a synthetic text image in accordance with some embodiments.

In some embodiments, the system 100 includes a second data set 112 including a plurality of augmented digital images each depicting a captured digital image augmented with a synthetic text image 310 including randomly generated text 314 on a randomly selected background image 308. FIG. 3 is an exemplary method 300 for creating a synthetic text image 310 in accordance with some embodiments. In some embodiments, a plurality of background images are stored in a database stored in a memory 120. In some embodiments, the memory 120 and/or memories described herein includes short-term memory, long-term storage memory, a dynamic random-access memory, a read only memory, a solid-state drive, hard-drive, a cloud database, and/or any type of electronic components capable of storing electronic data. In some embodiments, the first data set 110 and/or the second data set 112 are stored in the memory 120.

In an illustrative non-limiting example in FIG. 3, an example background image 308 and example generated text 314 are shown. In some embodiments, the system 100 includes a first control circuit 102 that generates a synthetic text image 310. In some embodiments, the first control circuit 102 randomly selects the background image 308 from one or more sets of textured images and/or randomly generated solid color images. In some embodiments, to generate a randomly generated solid color image, the first control circuit 102 generates a random number and, based on the randomly generated number, determines a corresponding color in accordance with an RGB (Red Green Blue) color model. In some embodiments, to generate randomly generated text 314, the first control circuit 102 randomly generates text by randomly selecting one or more combination of letters in an alphabet, numbers, symbols, font types, and text orientations. The first control circuit 102 may then randomly place the randomly generated text 314 on an area and/or a location on the randomly selected background image 308 as exemplified by the synthetic text image 310 shown in FIG. 3. In some embodiments, the first control circuit 102 deconstructs and/or splits the area and/or the location where the randomly generated text 314 is placed into its corresponding RGB channels 312 (e.g., a red channel distribution 302, a blue channel distribution 304, and a green channel distribution 306). In some embodiments, the first control circuit 102 determines and/or identifies a set of least participating values for each channel (e.g., a first set of least participating values in the red channel distribution 302, a second set of least participating values in the blue channel distribution 304, and a third set of least participating values in the green channel distribution 306). In some embodiments, the least participating values includes a channel value associated with a lowest corresponding frequency distribution, a set of channel values with corresponding frequency distributions that are within a predetermined frequency distribution range, and a set of channel values with corresponding frequency distributions that are equal to zero and/or no value. In some embodiments, in response to the determination of the set of least participating values for each channel, the first control circuit 102 randomly selects a value from the first set, the second set, and the third set of the least participating values. In some embodiments, the first control circuit 102 determines a font color selected for the randomly generated text 314 based on the combination of the selected channel values of the first set, the second set, and the third set.

In some embodiments, the first control circuit 102 generates the second data set 112 by selecting captured digital images from the first data set 110 and augmenting each selected digital image with at least one synthetic text image 310. In some embodiments, the first control circuit 102 randomly selects an orientation of the synthetic text image 310 relative to the corresponding selected captured digital image. In some embodiments, one or more of a first selection of a background image from the one or more sets of textured images and/or the randomly generated solid color images, a second selection of an area in the background image, a generation of text, and/or a third selection of an orientation of the text relative to a selected captured digital image may not be selected randomly, instead, it may be preselected beforehand.

In some embodiments, the system 100 includes a third data set 114 including a plurality of captured digital images each depicting an object of interest 200 having vertically oriented 124 text of interest 126. In some embodiments, the first control circuit 102 generates the third data set 114 by identifying, from the first data set 110, one or more of the captured digital images of an object of interest 200 that has vertically oriented 124 text of interest 126. In some embodiments, the first control circuit 102 stores the third data set 114 in the memory 120. Illustrative non-limiting examples of digital images depicting objects of interest having vertically oriented 124 text of interest 126 are shown in FIG. 4.

In some embodiments, the first control circuit 102 executes, at step 602, a machine learning algorithm 116 stored in a memory 120. In some embodiments, the machine learning algorithm 116 comprises a supervised learning, an unsupervised learning, a reinforcement learning, binary classification, Support Vector Machine (SVM), artificial neural networks, convolutional neural networks, You Only Look Once (YOLO), RetinaNet, Regional based CNN (RCNN), Fast-RCNN, Faster-RCNN, and Mask RCNN, and/or any one or more open-sourced machine learning algorithm available to public for download and use. Those skilled in the art will recognize that the embodiments described herein can use one or more publicly known and/or privately created machine learning algorithm 116 without departing from the scope of the invention. Additionally, those skilled in the art will recognize that the embodiments described herein improve on the accuracy of a trained machine learning model 118 on automatically detecting occurrences of and/or identifying one or more characters in vertically oriented 124 text of interest 126 and/or horizontally oriented 122 text of interest 126 depicted on captured digital images regardless of which machine learning algorithm 116 is used.

In some embodiments, the first control circuit 102 causes, at step 604, the machine learning algorithm 116 to be executed with the first data set 110 as a first input. In some embodiments, the first control circuit 102 causes, at step 606, the machine learning algorithm 116 to be executed with the second data set 112 as a second input. In some embodiments, the machine learning algorithm 116 can be trained on using the first data set 110 and/or the second data set 112 as one and/or both of the inputs. A benefit of training the machine learning algorithm 116 with both the first data set 110 and the second data set 112 is the enablement of the first control circuit 102 to more accurately determine, identify, and/or detect vertically oriented 124 and/or horizontally oriented 122 text of interest 126 on an object of interest at a higher rate relative to the resulting accuracy and/or rate without using these two data sets 110, 112. In some embodiments, the first control circuit 102 causes the machine learning algorithm 116 to be executed with the third data set 114 as a third input. A benefit of training the machine learning algorithm 116 with all three data sets 110, 112, 114 is the enablement of the first control circuit 102 to further accurately determine, identify, and/or detect vertically oriented 124 text of interest 126 on an object of interest at a greater higher rate relative to the resulting accuracy and/or rate without using these three data sets 110, 112, 114. Alternatively and/or in addition to, a fourth data set (not shown) may include a plurality of captured digital images each depicting an object of interest having horizontally oriented 122 text of interest 126. In some embodiments, the first control circuit 102 causes the machine learning algorithm 116 to be executed with the fourth data set as a fourth input. A benefit of training the machine learning algorithm 116 with at least the first data set 110, the second data set 112, and the fourth data set is the enablement of the first control circuit 102 to further accurately determine, identify, and/or detect horizontally oriented 122 text of interest 126 on an object of interest at a greater higher rate relative to the resulting accuracy and/or rate without using the first data set 110, the second data set 112, and the fourth data set.

In some embodiments, the first control circuit 102 causes, at step 608, the machine learning algorithm 116 to output a machine learning model 118 trained to automatically detect occurrences of vertically oriented 124 text of interest 126 depicted in captured digital images based on the first data set 110, the second data set 112, and/or the third data set 114. In some embodiments, the system 100 includes at least one camera 108 that captures one or more digital images of a scene. In some embodiments, a scene includes an entrance to a perimeter of a distribution center (DC) where delivery vehicles (e.g., trucks with cargo trailers, delivery trucks, and/or the like) pass through to enter the DC ground, an area proximate a delivery dock in the DC, and/or an area designated as a check-in area for delivery vehicles going into and/or out of the DC.

In some embodiments, the system 100 includes a second control circuit 104 coupled to at least one camera 108 and executes, at step 610, a trained machine learning model 118 to automatically detect vertically oriented 124 and/or horizontally oriented 122 text of interest 126 on an object of interest 200 depicted in captured one or more digital images of a scene. By one approach, the second control circuit 104 includes a microprocessor, a server, a microcomputer, a virtual machine operable on one or more processors, a cloud computer and/or server, and/or the like. In some embodiments, the second control circuit 104 and the first control circuit 102 are separate and distinct from one another. In some embodiments, the second control circuit 104 and the first control circuit 102 are integrated into a third control circuit 106. By one approach, the third control circuit 106 includes a microprocessor, a server, a microcomputer, a virtual machine operable on one or more processors, a cloud computer and/or server, and/or the like.

In some embodiments, the second control circuit 104 determines a first image resolution of the captured one or more digital images. In some embodiments, the second control circuit 104 determines that the first image resolution is less than a threshold image resolution. In some embodiments, the second control circuit 104, in response to the determination that the first image resolution is less than the threshold image resolution, pads the captured one or more digital images with images and/or pixels to match the threshold image resolution. Alternatively or in addition to, the second control circuit 104 determines whether the first image resolution is equal to the threshold image resolution. By one approach, if the first image resolution is not equal to the threshold image resolution, the second control circuit 104 may resize the image while maintaining the aspect ratio of the image. In resizing the image, the second control circuit 104 may resize the longer side in accordance with the threshold image resolution and pad the other side. In an illustrative non-limiting example, if the resolution of an image that was captured is 800×1600 and the threshold image resolution is 500×500, the second control circuit 104 may resize the image to 250×500 while maintaining the image's original aspect ratio of 1:2. The second control circuit 104 may pad the remaining 250 pixel of width with white, gray, and/or other color.

In some embodiments, the images/pixels used to pad are of a uniform and/or contrasting color relative to the text of interest. For example, the added images/pixels are white, gray, or other color. In some embodiments, the padding of the captured one or more digital images with the images and/or pixels avoids stretching the captured one or more digital images to match the threshold image resolution. Stretching of the captured one or more digital images may provide false detection of the text of interest 126 on an object of interest 200 and/or mis-identification of one or more characters of the text of interest 126 by the second control circuit 104 and/or the machine learning model 118. At least one benefit of padding a captured digital image with images and/or pixels to match a threshold image resolution is providing the identification and/or differentiation by the second control circuit 104 of letter O and number 0 (zero) and of letter I and number 1 (one) with a higher confidence level relative to the conventional confidence level associated with a conventionally trained machine learning algorithm.

In an illustrative non-limiting example, a camera 108 may be a CCTV camera having a resolution of 720 pixels. In some embodiments, the second control circuit 104 determines an image resolution of the captured digital images corresponds to, for example, 720 pixels based on the information associated with the captured digital images and/or provided by the camera 108. The second control circuit 104 may determine whether the 720 pixels image resolution is less than a threshold image resolution (for example, 1080 pixels). In response to the determination that the image resolution of the captured digital images is less than the threshold image resolution (e.g., 720 pixels is less than 1080 pixels), the second control circuit 104 pads the captured digital images with images and/or pixels to match the threshold image resolution. In this illustrative non-limiting example, the second control circuit 104 pads each of the captured digital images with 360 pixels to match the threshold image resolution (in this example, 1080 pixels). FIG. 5 illustrates a non-limiting example of text of interest 504 padded with white images and/or white pixels 502. As such, the padding of the captured digital images with the white images and/or white pixels enables the second control circuit 104 to avoid stretching the captured digital images in order to match the threshold image resolution. Additionally, the padding of the captured digital images with the white images and/or white pixels may enable the second control circuit 104 to identify and/or differentiate with at least 90% confidence between the letter O and the number 0 (zero) and between the letter I and number 1 (one). In an illustrative non-limiting example, when an image is resized without maintaining the image's original aspect ratio, the second control circuit 104 may execute the trained machine learning model 118 to differentiate and/or detect the letter O from the number 0 (zero) with a confidence of less than 90% (e.g., 75% confidence in detecting the letter O and 72% confidence in detecting the number 0 (zero) and/or vice-versa). In some embodiments, maintaining the original aspect ratio of an image may boost the confidence level of detecting the letter O and/or the number 0 (zero) to at least 90% confidence.

Figure 7:
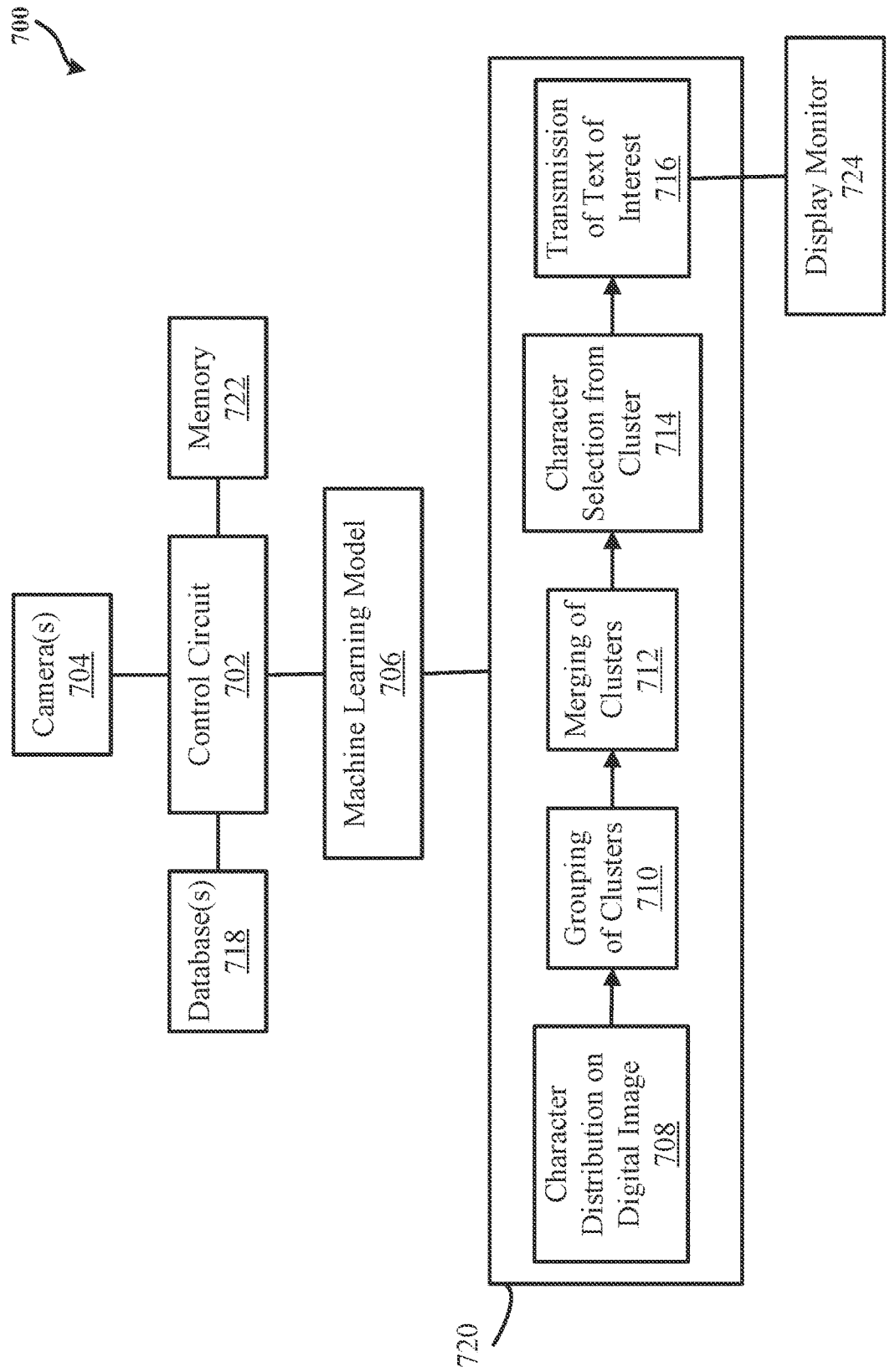
FIG. 7 illustrates a simplified block diagram of an exemplary pattern agnostic optical character recognition (OCR) system for determining text of interest on an object of interest in accordance with some embodiments.
Figure 12:
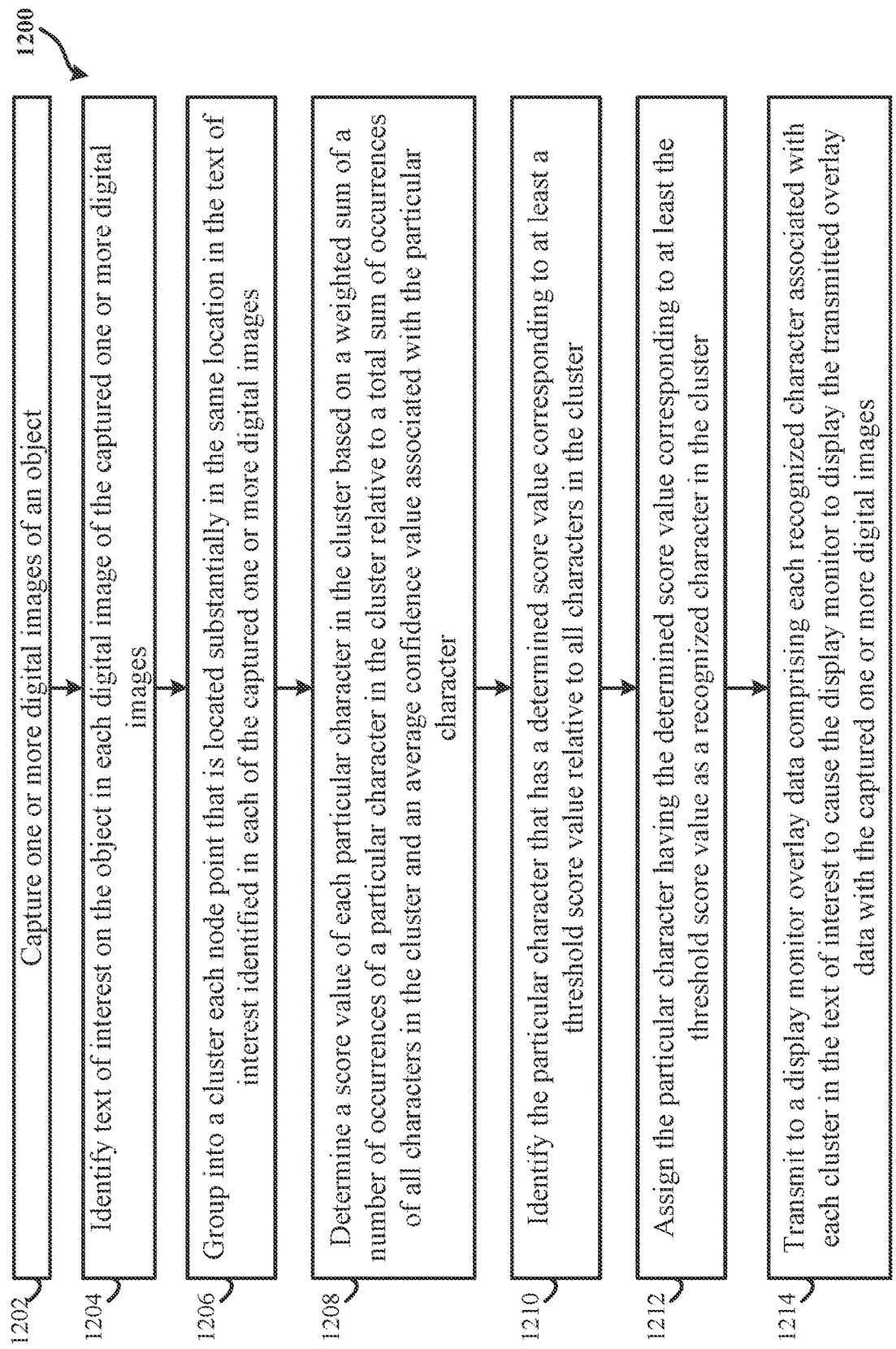
FIG. 12 shows a flow diagram of an exemplary method of determining text of interest on an object of interest in accordance with some embodiments.

FIG. 7 is described along with FIGS. 8 and 12. FIG. 7 illustrates a simplified block diagram of an exemplary pattern agnostic optical character recognition (OCR) system 700 for determining and/or identifying characters of text of interest 126 on an object of interest 200 in accordance with some embodiments. FIG. 8 illustrates a non-limiting example of an exemplary pattern agnostic optical character recognition (OCR) system differentiating between characters from one digital image to another in accordance with some embodiments. FIG. 12 shows a flow diagram of an exemplary method 1200 of determining text of interest on an object of interest in accordance with some embodiments. In some embodiments, the text of interest 126 includes a corresponding identification associated with the object of interest 200 and/or a combination of characters identifying the object of interest 200 from a different object of interest. In some embodiments, each character in the text of interest 126 is vertically aligned relative to other characters in the text of interest 126 (e.g., the vertically aligned characters of the text of interest 504 shown in FIG. 5). In some embodiments, each character in the text of interest 126 is horizontally aligned relative to other characters in the text of interest 126. In some embodiments, a character comprises a letter, a symbol of an alphabet, and/or a number. In some embodiments, the object of interest 200 includes a cargo trailer for use in distribution of goods, a truck, and/or a vehicle. In some embodiments, the text of interest 126 identifies the cargo trailer.

In some embodiments, the system 700 includes at least one camera 704 that captures, at step 1202, one or more digital images of an object of interest 200. In some embodiments, the at least one camera 704 may correspond to the at least one camera 108 of FIG. 1. In some embodiments, the at least one camera 704 is separate and distinct from the at least one camera 108 of FIG. 1. In some embodiments, the system 700 includes a control circuit 702 that executes a machine learning model 706 trained to determine and/or identify, at step 1204, text of interest 126 on the object of interest 200 in each captured digital image. In some embodiments, the machine learning model 706 overlays a region of interest (ROI) bounding box identifying the text of interest 126 on the corresponding captured digital image. In some embodiments, the machine learning model 706 may correspond to the machine learning model 118 of FIG. 1. In some embodiments, the machine learning model 706 is separate and distinct from the machine learning model 118 of FIG. 1. In some embodiments, the machine learning model 706 includes an OCR based on a machine learning algorithm distinct and separate from the machine learning algorithm 116 of FIG. 1. In some embodiments, the machine learning model 706 includes an OCR based on the machine learning algorithm 116. In some embodiments, the control circuit 702 stores each captured digital image with the corresponding determined and/or identified text of interest 126 in a queue and/or a memory 722. In some embodiments, the memory 722 includes the memory 120 of FIG. 1. In some embodiments, the memory 722 includes short-term memory, long-term storage memory, a dynamic random-access memory, a read only memory, a solid-state drive, hard-drive, a cloud database, and/or any type of electronic components capable of storing electronic data.

In some embodiments, in response to the determination and/or identification of the text of interest 126, the control circuit 102 performs and/or executes a temporal redundancy processing 720 on the captured digital images with the corresponding detected text of interest 126 having an ROI bounding box. By one approach, an ROI bounding box substantially surrounds the identified text of interest 126. In some embodiments, the temporal redundancy processing 720 includes character distribution on digital image 708, clusters formation 710, character selection from cluster 712, and/or transmission of text of interest 714.

In some embodiments, at 708, the control circuit 702 determines, for each captured digital image, a particular location of each character in the text of interest 126 by associating the top-left corner of the ROI bounding box with an x-y coordinate of (0,0). In some embodiments, anyone of the corners of the ROI bounding box may be selected and/or associated by the control circuit 702 as the (0,0) x-y coordinate origin. In some embodiments, at 708, the control circuit 702 normalizes the location of each character in the text of interest 126 with dimension of the ROI bounding box. At least one benefit and/or advantage of determining a particular location of each character in the text of interest 126 relative to the dimension of the ROI bounding box as opposed to the dimension of the captured digital image is that the control circuit 702 is able to differentiate characters of the text of interest 126 that are lying at the same position from one captured digital image to another. An illustrative non-limiting example of OCR system 700 differentiating between characters from a first captured digital image 802 to a second captured digital image 806 as shown in FIG. 8. In such example in FIG. 8, by normalizing the location of each character in the text of interest 126 with dimension of the ROI bounding box, the control circuit 702 determines that the letter J in the second captured digital image 806 is a missing character in an identified text of interest 804 in the first captured digital image 802. In some embodiments, the control circuit 702 also determines that the letter B of an identified text of interest 808 in the second captured digital image 806 and the number 8 of the identified text of interest 804 in the first captured digital image 802 lie at the same position.

In some embodiments, at 710 and at step 1206, the control circuit 702 groups into a cluster each node point that is located substantially in the same location in the text of interest 126 that has been identified in each of the captured one or more digital images. In some embodiments, a node point (e.g., a node point 908 in FIG. 9) corresponds to an identified character in an image. As such, the grouping into a cluster each node point that is located substantially at the same location in the text of interest 126 of each captured digital image corresponds to grouping each identified character located substantially in the same location in the text of interest 126 in each captured digital image.

In some embodiments, in text of interest 126 having characters that are vertically aligned relative to one another, the control circuit 702 determines that a number of nodes can be grouped into a cluster when there are at least five node points that are located substantially in the same location. In some embodiments, in a scenario where the text of interest 126 has characters that are vertically aligned relative to one another and upon a determination by the control circuit 102 that there are less than five node points, the control circuit 702 may determine that these node points cannot be grouped into a cluster.

In some embodiments, in text of interest 126 having characters that are horizontally aligned relative to one another, the control circuit 702 determines that a number of nodes can be grouped into a cluster when there are at least four node points that are located substantially in the same location. In some embodiments, in a scenario where the text of interest 126 has characters that are horizontally aligned relative to one another and upon a determination by the control circuit 702 that there are less than four node points, the control circuit 702 may determine that these node points cannot be grouped into a cluster. Alternatively or in addition to, the control circuit 702 may determine that a number of nodes can be grouped into a cluster when the control circuit 702 determines that a maximum distance between node points corresponds to a predetermined threshold distance. In some embodiments, the predetermined threshold distance includes a single value and/or a range of values. In some embodiments, the control circuit 702 determines that a maximum distance between two node points corresponds to 7 unit distance in x and/or y direction and/or in radial distance. In response, the control circuit 702 may determine that the two node points are part of the same cluster. In some embodiments, the maximum distance between two node points may be predetermined and/or algorithmically generated.

In some embodiments, the grouping of nodes into one or more clusters may result in multiple clusters being associated with a single character lying at the same location. For example, the control circuit 702 may determine and/or detect multiple clusters for a character lying at the same location. In some embodiments, at 712, the control circuit 702 merges multiple clusters associated with a single character lying at the same location. For example, for every cluster in the multiple clusters for a character lying at the same location, the control circuit 702 may determine whether a first cluster and a second cluster merges into a single cluster based on a first rule embodied by $y_d < y_a/d$, where d is a predetermined constant value, $y_a$ is an average cluster distance between a total number of clusters, $y_a/d$ is a threshold value to determine whether two or more clusters for a character lying at the same location should be merged into a single cluster, and $y_d$ is a distance between two clusters for a character lying at the same location. In some embodiments, a distance between two clusters is based on a distance from a center of one cluster to a center of another cluster. In an illustrative non-limiting example, the control circuit 702 may, for each cluster, determine the coordinates of all the nodes and determine an average value of all the x or y coordinates of the nodes in the cluster depending on the orientation (e.g., x coordinate in case of horizontal or y coordinate in case of vertical).

In some embodiments, the control circuit 702 may find and/or determine the predetermined constant value d corresponding to the total number of clusters detected in an image. In some embodiments, at least one database 718 stores a table including a number of predetermined constant values for each possible total number of clusters in an image. In some embodiments, for a vertically oriented text of interest, the predetermined constant value may include 1.1, 1.5, and/or 2. In some embodiments, the control circuit 702 selects the value 1.1 as the predetermined constant value upon a determination that the total number of clusters (i.e., before the merging of clusters at 712 and after the grouping of clusters at 710) is greater than 14. In some embodiments, the control circuit 702 selects the value 1.5 as the predetermined constant value upon a determination that the total number of clusters is greater than 8 but less than 15. In some embodiments, the control circuit 702 selects the value 2 as the predetermined constant value upon a determination that the total number of clusters is less than 9. In some embodiments, for a horizontally oriented text of interest, the predetermined constant value may include 2 (for 0 to 8 clusters), 1.5 (for 8 to 12 clusters), 1.3 (for 12 to 14 clusters), and 1.1 (for 14 or more clusters). In some embodiments, the predetermined constant value for a vertically oriented text of interest and/or a horizontally oriented text of interest may be algorithmically generated.

In some embodiments, the control circuit 702 determines the average cluster distance $y_a$ between the total number of clusters in a digital image. In some embodiments, the control circuit 702 finds the threshold value $y_a/d$ by dividing the average cluster distance $y_a$ by the predetermined constant value d. In some embodiments, the control circuit 702 determines whether a distance ($y_d$) between two adjacent clusters is less than the threshold value ($y_a/d$). If so, then the control circuit 702 may merge the two clusters. In some embodiments, the control circuit 702 performs an evaluation for every two clusters in the multiple clusters associated with a single character lying at the same location in accordance with the first rule.

In some embodiments, subsequent to the grouping of clusters at 710 and for each cluster in the text of interest 126, the control circuit 702 determines and/or selects, at 714, a character among the characters associated with the nodes in a cluster to be assigned as a recognized character. For example, the control circuit 702 may determine, at step 1208, a score value for each particular character (or node) in the cluster based on a weighted sum of a number of occurrences of the particular character in the cluster relative to a total sum of occurrences of all characters in the cluster and an average confidence value associated with the particular character. In some embodiments, the control circuit 702 identifies, at 714 and at step 1210, the particular character that has a determined score value corresponding to at least a threshold score value relative to all characters in the cluster. In some embodiments, the control circuit 702 assigns, at 714 and at step 1212, the particular character having the determined score value corresponding to at least the threshold score value as a recognized character in the cluster. For example, at 714, the control circuit 702 may recognize each character in the text of interest 126 based on a character having a highest score value relative to score values calculated for each particular character in each of the clusters, where a score value is in accordance with a rule embodied by $s_i = w_c \ast c_i + w_o \ast o_n$, where $s_i$ is the score value for a particular character (or node), $w_c$ is a first weight constant (e.g., 0.3, 0.7, a value between 0.3 to 0.7, and/or a value that is algorithmically determined), $c_i$ is a ratio of the number of occurrences of a particular character to a total number of characters in a cluster, $w_o$ is a second weight constant (e.g., 0.3, 0.7, a value between 0.3 to 0.7, and/or a value that is algorithmically determined), and $o_n$ is an average confidence value associated with the particular character. In some embodiments, the control circuit 702 determines average confidence value $o_n$ by determining the ratio of the number of occurrences a character in a cluster has occurred ($o_i$) to the sum the total number of occurrences for all the characters in a cluster (k). For example, for each remaining cluster after the grouping of clusters at 710 and for each character (or a node) in a cluster, the control circuit 702 determines the number of occurrences a character in a cluster has occurred ($o_i$). In some embodiments, the control circuit 702 takes the average of all the confidence values associated with a character ($c_i$). In some embodiments, the control circuit 702 sums the total number of occurrences for all the characters in a cluster (k). In some embodiments, the control circuit 702 calculates a score ($s_i$) for each character by determining a weighted sum of the number of occurrences of the character relative to the total sum and the average confidence values associated with the character. In some embodiments, the control circuit 702 determines a single character to assign to a cluster based on the character that has the highest calculated score relative to the other calculated scores of the other character in the cluster. In some embodiments, the control circuit 702 recognizes a character in a cluster based on the assigned character. In some embodiments, the control circuit 702 recognizes the text of interest 126 based on a combination of the recognized characters in the text of interest 126. In some embodiments, after recognizing each character in the text of interest 126, the control circuit 702 transmits, at 716 and at step 1214, to a display monitor 724 overlay data including each recognized character associated with each cluster in the text of interest 126 causing the display monitor 724 to display the transmitted overlay data with the captured one or more digital images.

Figure 9:
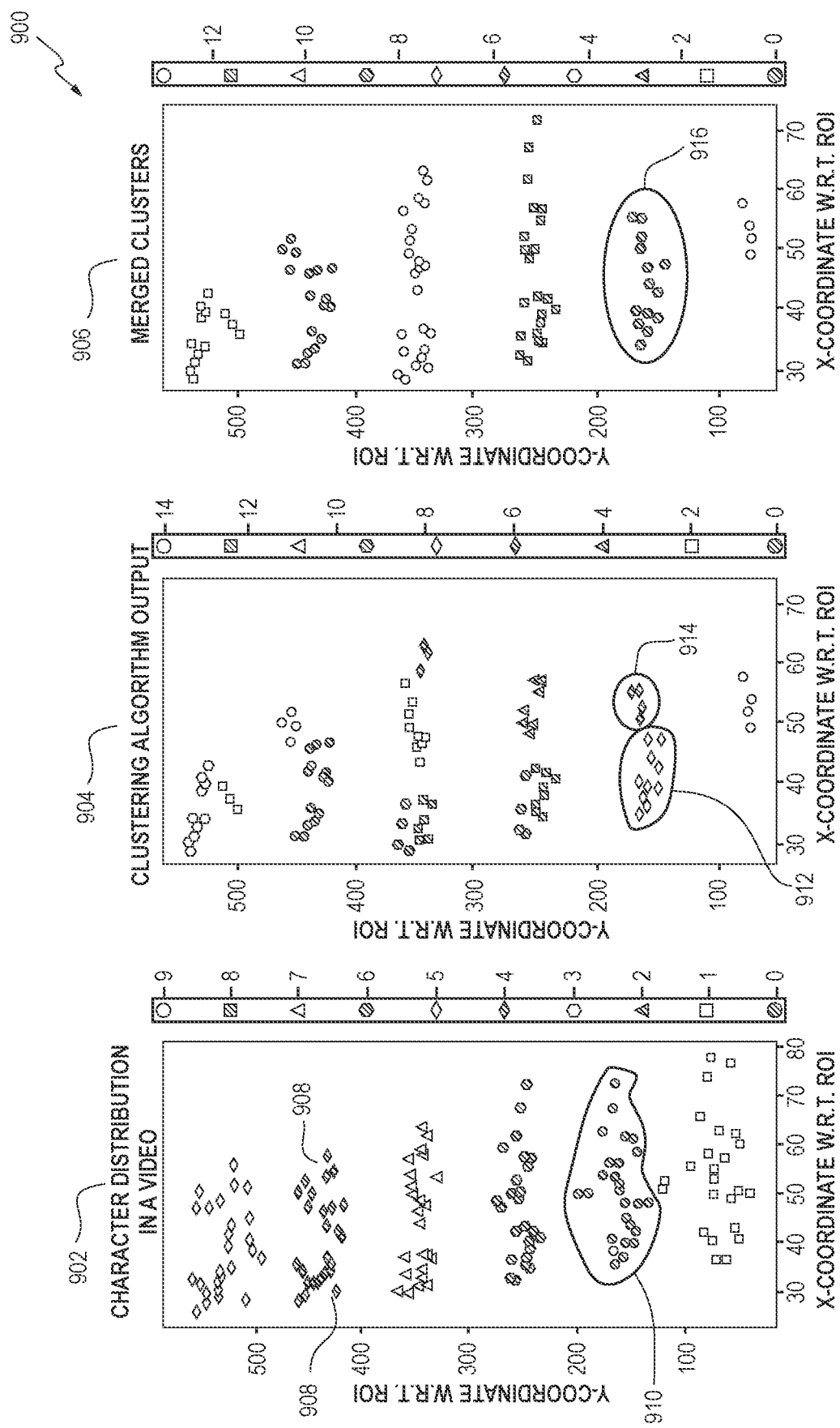
FIG. 9 shows an illustrative non-limiting example of a temporal redundancy processing in accordance with some embodiments.

FIG. 9 shows an illustrative non-limiting example of a temporal redundancy processing 720 in accordance with some embodiments. In FIG. 9, three x-y coordinate charts are shown: a first x-y coordinate chart 902, a second x-y coordinate chart 904, and third x-y coordinate chart 906. In some embodiments, each x-y coordinate chart corresponds to an ROI bounding box that substantially surrounds an identified text of interest 126. In some embodiments, the first x-y coordinate chart 902 corresponds to a visual representation of the processing steps that occur in the character distribution on digital image 708 of FIG. 7 as described herein. In some embodiments, the second x-y coordinate chart 904 corresponds to a visual representation of the processing steps that occur in the grouping of clusters 710 of FIG. 7 as described herein. In some embodiments, the third x-y coordinate chart 906 corresponds to a visual representation of the processing steps that occur in the merging of clusters 906 of FIG. 7 as described herein. In some embodiments, at 902, a number of digital images were captured and each detected character in the identified text of interest 126 in every captured digital image is represented by the nodes 908 shown in the first x-y coordinate chart 902. In some embodiments, at 904, a control circuit (e.g., the control circuit 102 of FIG. 1, third control circuit 106, and/or the control circuit 702 of FIG. 7) determines that a plurality of node points are located substantially in the same location in the identified text of interest 126 of the captured one or more digital images. In some embodiments, the plurality of node points are grouped into the same cluster when each node point of the plurality of node points is not more than seven unit distance from other node points in the plurality of node points. For example, at 904, a number of nodes 910 in first x-y coordinate chart 902 were grouped by the control circuit into two clusters: a first cluster 912 and a second cluster 914.

In some embodiments, the control circuit determines that a plurality of clusters are located substantially in the same location in the text of interest 126 of the captured one or more digital images. Alternatively or in addition to, the control circuit merges two or more clusters of the plurality of clusters based on a unit distance between each cluster of the two or more clusters being less than a threshold merging value. In some embodiment, the threshold merging value is based on a ratio between a predetermined constant value associated with a total number of clusters associated with the text of interest 126 and an average cluster distance between each cluster of the two or more clusters. In some embodiments, a database stores a plurality of threshold merging values. By one approach, each threshold merging value may be associated with a possible total number of clusters in the text of interest 126 and usable when a plurality of node points are located substantially in the same location in the text of interest 126. In some embodiments, the database may correspond to the database(s) 718. In some embodiments, a threshold score value corresponds to a highest score value relative to determined score values of all characters in the cluster as described herein. For example, at 906, the first cluster 912 and the second cluster 914 were merged into a single cluster 916. In some embodiments, a particular location of the single cluster 916 in the third x-y coordinate chart 906 corresponds to a location of a particular character in the text of interest 126. In a subsequent processing, the control circuit may select one of the characters corresponding to the nodes in the single cluster 916 as described in the processing steps that occur in the character selection from cluster 714 as described herein. In some embodiments, the control circuit may assign the selected character as the recognized character for that particular location in the text of interest 126.

Figure 10:
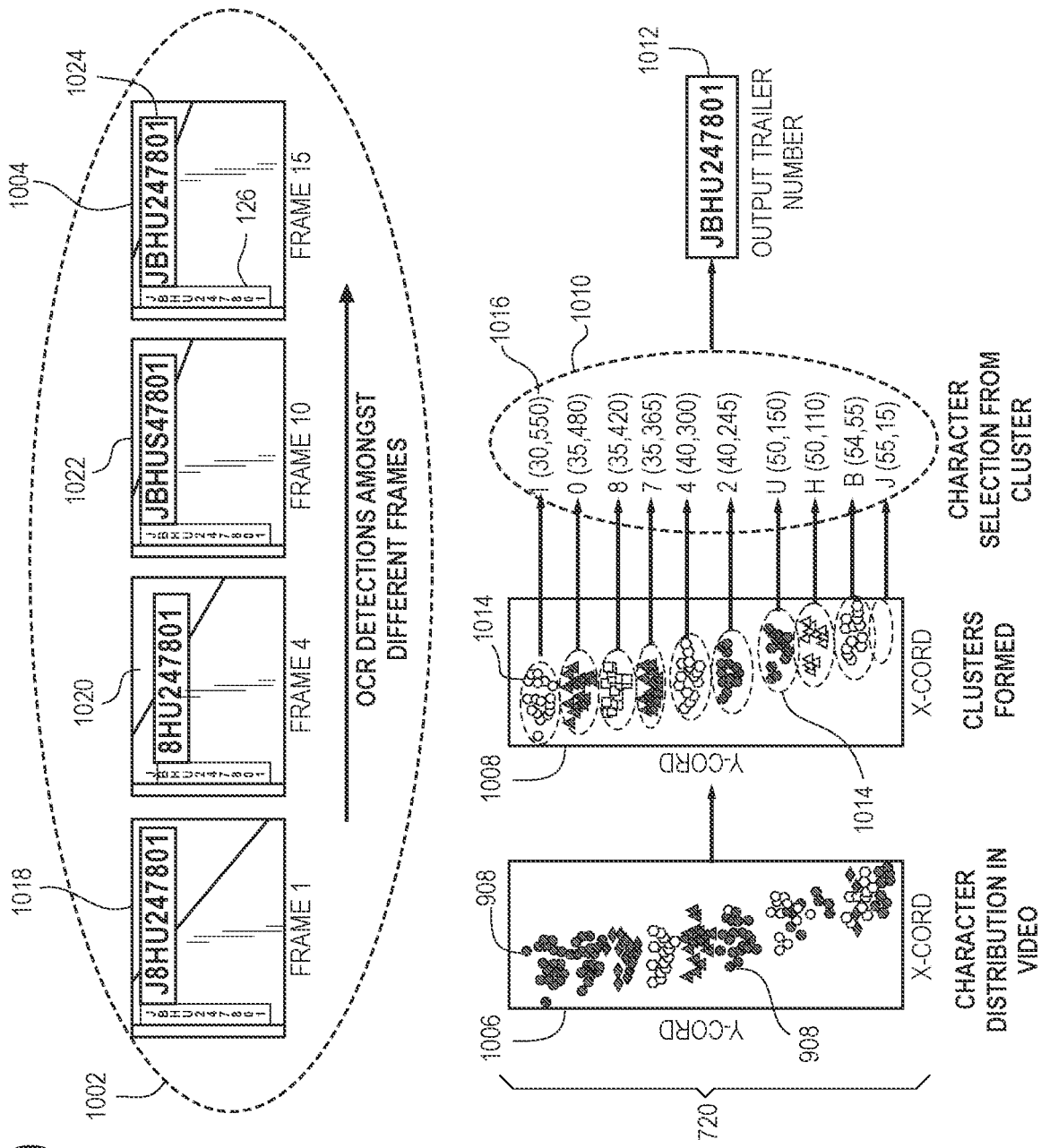
FIG. 10 is an illustrative non-limiting example of recognizing text of interest on an object of interest in accordance with some embodiments.

Another illustrative non-limiting example of recognizing text of interest on an object of interest in accordance with some embodiments is shown in FIG. 10. In some embodiments, the control circuit 702 receives, at 1002, a plurality of digital images of a scene from at least one camera 704. In such an example, the at least one camera 704 captures digital images of an object of interest 200 (e.g., a truck with an attached cargo trailer). As shown in FIG. 10, there are 15 digital images that were captured by the at least one camera 704. By one approach, frames 1, 4, 10, and 15 out of the 15 digital images are shown for illustration purposes. In some embodiments, the processing by the control circuit 702 that occur during the temporal redundancy processing 720 is shown for the $15^{th}$ frame 1004 of the 15 captured digital images. In some embodiments, each detected character in an identified text of interest 126 in the captured 15 digital images is represented by the nodes 908 shown at 1006. In some embodiments, a number of nodes 908 were grouped and/or merged by the control circuit 702 into several distinct clusters 1014 as shown at 1008. In some embodiments, the control circuit 702 determines a character for each cluster 1014 that has a highest calculated score (as described herein) relative to the other calculated scores of the other character in the corresponding cluster 1014 and assigns the highest scoring character as the recognized character for that particular location in the text of interest 126 as shown at 1010. In the example shown in FIG. 10, the last character 1016 in the text of interest 126 is the number "1" located in the x-y coordinate (30, 550). In some embodiments, the control circuit 702 transmits the recognized characters 1012 of the text of interest 126 to the display monitor 724 as an overlay data on the $15^{th}$ frame 1004 (e.g., the fourth recognized characters 1024).

In some embodiments, each video image shown in the display monitor 724 includes a corresponding overlay data as exemplified in FIG. 10. In such an embodiment, the corresponding overlay data is based on the recognized characters of the control circuit 702 as the control circuit 702 processes at least two or more captured digital images. For example, the control circuit 702 may overlay frame 1 with a first recognized characters 1018 determined based on previous number of captured digital images prior to frame 1. In another example, the control circuit 702 may overlay frame 4 with a second recognized characters 1020 determined based on frames 1 through 4 and the previous number of captured digital images prior to frame 1. In another example, the control circuit 702 may overlay frame 10 with a third recognized characters 1022 determined based on frames 1 through 10 and the previous number of captured digital images prior to frame 1. In another example, the control circuit 702 may overlay frame 15 with a fourth recognized characters 1024 determined based on frames 1 through 15 and the previous number of captured digital images prior to frame 1. Alternatively, the control circuit 702 may overlay each video image shown in the display monitor 724 only with a final recognized characters of the text of interest 126 where each of the final recognized characters of the text of interest 126 has a highest calculated score (as described herein) relative to the other calculated scores of the other character in the cluster 1014.

In some embodiments, in temporal redundancy 720, the control circuit 702 may process at a minimum 4 to 5 frames/images before outputting an overlay data 1118 and/or displaying the overlay data 1118. In some embodiments, if any text of interest lie within 20 pixels of the boundaries of a captured image, the control circuit 702 may not consider and/or ignore those text of interest. In an illustrative non-limiting example, the control circuit 702 may assign an identification (ID) to each text of interest and use that ID to track a text of interest throughout the captured images. In some embodiments, for a particular ID, if the control circuit 702 does not detect and/or receive images having a text of interest associated with the particular ID for a predetermined number of consecutive frames/image (e.g., 20 consecutive frames/images, a value less than 20 consecutive frames/images, 20, a value greater than 20 consecutive frames/images and/or a value that is algorithmically generated), the control circuit 702 may determine that the text of interest associated with the particular ID has left the frame/image and/or is no longer captured by a camera. In some embodiments, the control circuit 702 may track a text of interest by determining whether a text of interest in a subsequent frame/image lie in a nearby vicinity and/or a predetermined radial distance from a centre of a recently, currently, and/or previously detected text of interest with the same associated ID. In some embodiments, the predetermined radial distance may include the distance from the centre of the identified and/or detected text of interest to the smaller and/or shorter edge of the identified and/or detected text of interest.

Figure 11:
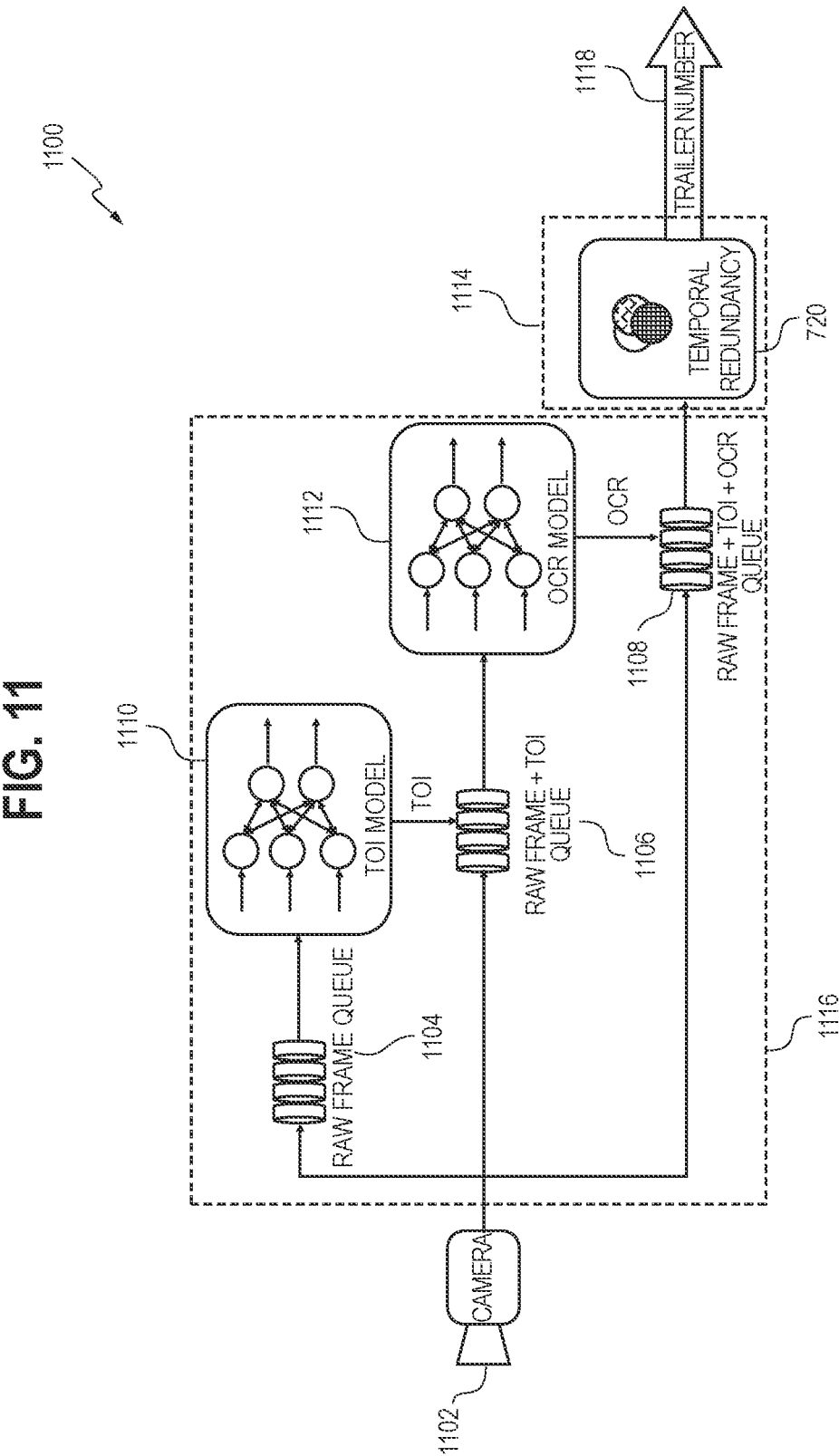
FIG. 11 illustrates a simplified block diagram of an exemplary pattern agnostic optical character recognition (OCR) system for determining text of interest on an object of interest in accordance with some embodiments.

FIG. 11 illustrates a simplified block diagram of an exemplary pattern agnostic optical character recognition (OCR) system 1100 for determining text of interest on an object of interest in accordance with some embodiments. In some embodiments, the system 1100 includes at least one camera 1102, a text of interest (TOI) model 1110, and/or an OCR model 1112. In some embodiments, a first control circuit 1116 executes the TOI model 1110 and the OCR model 1112. In some embodiments, the TOI model 1110 may correspond to the machine learning model 118 of FIG. 1. In some embodiments, the OCR model 1112 may correspond to the machine learning model 706 of FIG. 7. In some embodiments, the at least one camera 1102 captures digital images of a scene including an object of interest 200. In some embodiments, the TOI model 1110 is trained to detect text of interest 126 on the object of interest 200. In one configuration, the TOI model 1110 is trained to detect objects of interest 200 having vertically oriented text of interest. Alternatively or in addition to, the TOI model 1110 is trained to detect an object of interest 200 having horizontally oriented text of interest. For example, the TOI model 1110 receives the captured digital images 1104 and outputs digital images 1106. By one approach, each of the digital images 1106 may be overlayed with a region of interest (ROI) bounding box over the detected text of interest 126. In some embodiments, the OCR model 1112 receives the digital images 1106. In some embodiments, the OCR model 1112 is trained to identify characters in the detected text of interest 126 and/or provide confidence value corresponding to each of the identified characters. By one approach, a confidence value may correspond to the OCR model's 1112 confidence that the identified character is the actual character in the text of interest as shown. In some embodiments, the OCR model 1112 outputs digital images 1108 each having identified characters in the detected text of interest 126. In some embodiments, a second control circuit 1114 receives the digital images 1108 and executes the temporal redundancy processing 720 on the received digital images 1108. In some embodiments, the temporal redundancy processing 720 includes the steps in the character distribution on digital image 708, the grouping of clusters at 710, the merging of clusters at 712, and/or the character selection from cluster 714 as described herein. In some embodiments, in response to the temporal redundancy processing 720, the control circuit 1114 transmits an overlay data 1118 including the recognized characters in the text of interest and/or causes a display to display the captured digital images with the overlay data. At least an advantage in the execution of the temporal redundancy processing 720 is ability to recognize the text of interest and/or the identification number associated with the text of interest with at least 96% accuracy.

Figure 13:
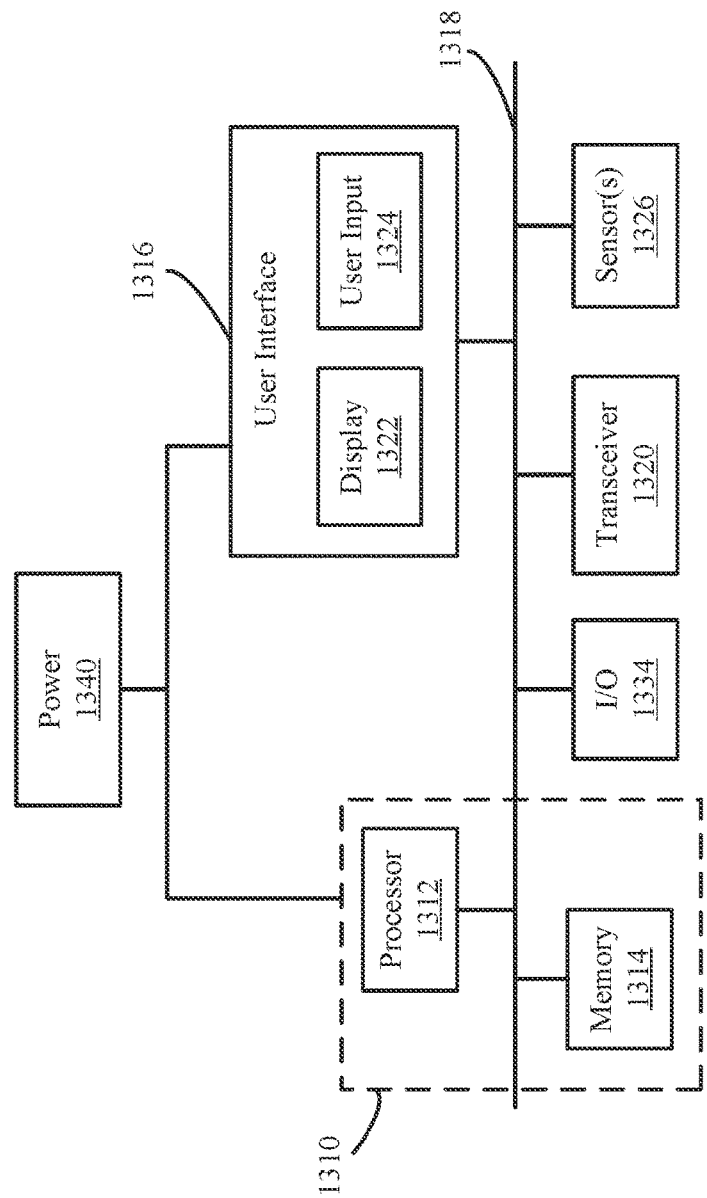
FIG. 13 illustrates an exemplary system for use in implementing methods, techniques, devices, apparatuses, systems, servers, sources and detecting and/or determining text of interest, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 13 illustrates an exemplary system 1300 that may be used for implementing any of the components, circuits, circuitry, systems, functionality, apparatuses, processes, or devices of the system 100 of FIG. 1, the system 700 of FIG. 7, the system 1100 of FIG. 11, the method 600 of FIG. 6, the method 1200 of FIG. 12, and/or other above or below mentioned systems or devices, or parts of such circuits, circuitry, functionality, systems, apparatuses, processes, or devices. For example, the system 1300 may be used to implement some or all of the system for detecting a vertically oriented text of interest and/or a horizontally oriented text of interest, and/or the system for determining and/or recognizing text of interest on an object of interest, the first control circuit 102, the second control circuit 104, the at least one camera 108, the memory 120, the at least one camera 704, the control circuit 702, the database(s) 718, the memory 722, the display monitor 724, the at least one camera 1102, the first control circuit 1116, and/or the second control circuit 1114, third control circuit 106, and/or other such components, circuitry, functionality and/or devices. However, the use of the system 1300 or any portion thereof is certainly not required.

By way of example, the system 1300 may comprise a processor module (or a control circuit) 1312, memory 1314, and one or more communication links, paths, buses or the like 1318. Some embodiments may include one or more user interfaces 1316, and/or one or more internal and/or external power sources or supplies 1340. The control circuit 1312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1312 can be part of control circuitry and/or a control system 1310, which may be implemented through one or more processors with access to one or more memory 1314 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1300 may be used to implement one or more of the above or below, or parts of, components, circuits, systems, processes and the like. For example, the system 1300 may implement the system for detecting a vertically oriented text of interest and/or a horizontally oriented text of interest, and/or the system for determining and/or recognizing text of interest on an object of interest with the first control circuit 102, the second control circuit 104, the control circuit 702, the first control circuit 1116, the second control circuit 1114, and/or third control circuit 106 being the control circuit 1312.

The user interface 1316 can allow a user to interact with the system 1300 and receive information through the system. In some instances, the user interface 1316 includes a display 1322 and/or one or more user inputs 1324, such as buttons, touch screen, track ball, keyboard, mouse, etc., which can be part of or wired or wirelessly coupled with the system 1300. Typically, the system 1300 further includes one or more communication interfaces, ports, transceivers 1320 and the like allowing the system 1300 to communicate over a communication bus, a distributed computer and/or communication network (e.g., a local area network (LAN), the Internet, wide area network (WAN), etc.), communication link 1318, other networks or communication channels with other devices and/or other such communications or combination of two or more of such communication methods. Further the transceiver 1320 can be configured for wired, wireless, optical, fiber optical cable, satellite, or other such communication configurations or combinations of two or more of such communications. Some embodiments include one or more input/output (I/O) interface 1334 that allow one or more devices to couple with the system 1300. The I/O interface can be substantially any relevant port or combinations of ports, such as but not limited to USB, Ethernet, or other such ports. The I/O interface 1334 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1326 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1300 comprises an example of a control and/or processor-based system with the control circuit 1312. Again, the control circuit 1312 can be implemented through one or more processors, controllers, central processing units, logic, software and the like. Further, in some implementations the control circuit 1312 may provide multiprocessor functionality.

The memory 1314, which can be accessed by the control circuit 1312, typically includes one or more processor readable and/or computer readable media accessed by at least the control circuit 1312, and can include volatile and/or non-volatile media, such as RAM, ROM, EEPROM, flash memory and/or other memory technology. Further, the memory 1314 is shown as internal to the control system 1310; however, the memory 1314 can be internal, external or a combination of internal and external memory. Similarly, some or all of the memory 1314 can be internal, external or a combination of internal and external memory of the control circuit 1312. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1314 can store code, software, executables, scripts, data, content, lists, programming, programs, log or history data, user information, customer information, product information, and the like. While FIG. 13 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for training a machine learning algorithm to detect text of interest, the system comprising:
 a first data set comprising a plurality of captured digital images each depicting an object of interest;
 a second data set comprising a plurality of augmented digital images each depicting a captured digital image augmented with a synthetic text image comprising randomly generated text on a randomly selected background image;
 a first control circuit configured to:
  execute a machine learning algorithm stored in a memory;
  cause the machine learning algorithm to be executed with the first data set as a first input;
  cause the machine learning algorithm to be executed with the second data set as a second input; and
  cause the machine learning algorithm to output a machine learning model trained to automatically detect occurrences of vertically oriented text of interest depicted in captured digital images based on the first data set and the second data set;
 at least one camera configured to capture one or more digital images of a scene; and
 a second control circuit coupled to the at least one camera and configured to execute the machine learning model to automatically detect vertically oriented text of interest on the object of interest depicted in the captured one or more digital images of the scene.

2. The system of claim 1, wherein the object of interest comprises a cargo trailer for use in distribution of goods.

3. The system of claim 1, wherein the vertically oriented text of interest comprises a corresponding identification associated with the object of interest.

4. The system of claim 1, wherein the vertically oriented text of interest comprises text having a combination of one or more alphabet and numerical characters.

5. The system of claim 1, wherein the synthetic text image comprises text that is randomly oriented.

6. The system of claim 1, wherein the second control circuit is further configured to:
- determine a first image resolution of the captured one or more digital images;
- determine that the first image resolution is less than a threshold image resolution; and
- in response to the determination that the first image resolution is less than the threshold image resolution, pad the captured one or more digital images with images to match the threshold image resolution, wherein the padding of the captured one or more digital images with the images avoids stretching the captured one or more digital images to match the threshold image resolution and facilitates a first differentiation between letter O and number 0 and a second differentiation between letter I and number 1.

7. The system of claim 1, wherein the first control circuit is further configured to determine the synthetic text image based on:
- a first selection of a background image;
- a second selection of an area in the background image;
- a generation of the text; and
- a third selection of an orientation of the text.

8. The system of claim 7, wherein one or more of the first selection, the second selection, the generation and the third selection are randomly determined by the first control circuit.

9. The system of claim 7, wherein the first control circuit is further configured to determine a font color of the generated text based on:
- a determination of red, green, and blue (RGB) channel distributions of the selected area in the background image;
- a determination of a set of least participating values in each RGB channel;
- randomly select a value in each set associated with each RGB channel; and
- determine the font color based on the randomly selected value in each set associated with each RGB channel.

10. The system of claim 9, wherein the set of least participating values in each RGB channel comprises a range of values not represented in a corresponding distribution of each RGB channel.

11. The system of claim 1, further comprising a third data set comprising a plurality of captured digital images each depicting the object of interest having vertically oriented text of interest, wherein the first control circuit is further configured to cause the machine learning algorithm to be executed with the third data set as a third input.

12. A method for training a machine learning algorithm to detect text of interest, the method comprising:
- executing, by a first control circuit coupled to a memory, a machine learning algorithm stored in the memory;
- causing, by the first control circuit, the machine learning algorithm to be executed with a first data set as a first input, wherein the first data set comprises a plurality of captured digital images each depicting an object of interest;
- causing, by the first control circuit, the machine learning algorithm to be executed with a second data set as a second input, wherein the second data set comprises a plurality of augmented digital images each depicting a captured digital image augmented with a synthetic text image comprising randomly generated text on a randomly selected background image;
- causing, by the first control circuit, the machine learning algorithm to output a machine learning model trained to automatically detect occurrences of vertically oriented text of interest depicted in captured digital images based on the first data set and the second data set; and
- executing, by a second control circuit coupled to at least one camera configured to capture one or more digital images of a scene, the machine learning model to automatically detect the vertically oriented text of interest on the object of interest in the captured one or more digital images of the scene.

13. The method of claim 12, wherein the object of interest comprises a cargo trailer for use in distribution of goods.

14. The method of claim 12, wherein the vertically oriented text of interest comprises a corresponding identification associated with the object of interest.

15. The method of claim 12, wherein the vertically oriented text of interest comprises text having a combination of one or more alphabet and numerical characters.

16. The method of claim 12, wherein the synthetic text image comprises text that is randomly oriented.

17. The method of claim 12, further comprising:
- determining, by the second control circuit, a first image resolution of the captured one or more digital images;
- determining, by the second control circuit, that the first image resolution is less than a threshold image resolution; and
- in response to the determination that the first image resolution is less than the threshold image resolution, padding, by the second control circuit, the captured one or more digital images with images to match the threshold image resolution, wherein the padding of the captured one or more digital images with the images avoids stretching the captured one or more digital images to match the threshold image resolution and facilitates a first differentiation between letter O and number 0 and a second differentiation between letter I and number 1.

18. The method of claim 12, further comprising, in a determination of the synthetic text image:
- first selecting, by the first control circuit, a background image;
- second selecting, by the first control circuit, an area in the background image;
- generating, by the first control circuit, text; and
- third selecting, by the first control circuit, an orientation of the text.

19. The method of claim 18, wherein one or more of the first selection, the second selection, the generation and the third selection are randomly determined by the first control circuit.

20. The method of claim 18, further comprising:
- determining, by the first control circuit, red, green, and blue (RGB) channel distributions of the selected area in the background image;
- determining, by the first control circuit, a set of least participating values in each RGB channel;

randomly selecting, by the first control circuit, a value in each set associated with each RGB channel; and determining, by the first control circuit, a font color of the generated text based on the randomly selected value in each set associated with each RGB channel.

21. The method of claim 20, wherein the set of least participating values in each RGB channel comprises a range of values not represented in a corresponding distribution of each RGB channel.

22. The method of claim 12, further comprising:

causing, by the first control circuit, the machine learning algorithm to be executed with a third data set as a third input, wherein the third data set comprises a plurality of captured digital images each depicting the object of interest having a vertically oriented text of interest; and outputting, by the first control circuit via the machine learning algorithm, the trained machine learning model based additionally on the third data set.

23. A system for detecting text of interest, the system comprising:

at least one camera configured to capture one or more digital images of a scene including an object of interest, the object of interest having vertically oriented text of interest; and a first control circuit coupled to the at least one camera and configured to execute a machine learning model stored in a memory to automatically detect the vertically oriented text of interest in the captured one or more digital images of the scene, wherein the machine learning model is trained, using a second control circuit, to automatically detect occurrences of vertically oriented text of interest on the object of interest depicted in captured one or more digital images with inputs comprising:

a first data set comprising a plurality of captured digital images each depicting a representative object of interest; and a second data set comprising a plurality of augmented digital images each depicting a captured digital image augmented with a synthetic text image comprising a randomly generated text on a randomly selected background image.

24. The system of claim 23, wherein the inputs further comprises a third data set comprising a plurality of captured digital images each depicting of the representative object of interest having a representative vertically oriented text of interest.

* * * * *